United States Patent [19]
Graafsma et al.

[11] 3,895,422
[45] July 22, 1975

[54] SCREW JACK PINION GEAR AND METHOD OF MAKING SAME

[75] Inventors: Richard S. Graafsma, Benton Harbor, Mich.; George H. Morgan, South Bend, Ind.

[73] Assignee: Auto Specialties Manufacturing Co., St. Joseph, Mich.

[22] Filed: July 31, 1974

[21] Appl. No.: 493,280

Related U.S. Application Data

[62] Division of Ser. No. 388,391, Aug. 15, 1973, Pat. No. 3,862,577.

[52] U.S. Cl............................ 29/159.2; 72/404
[51] Int. Cl.............................................. B21d 53/28
[58] Field of Search ............ 29/159.2; 72/352, 358, 72/359, 377, 354, 403, 404; 74/431, 432, 434, 457, 459.5, 460

[56] References Cited
UNITED STATES PATENTS

| | | |
|---|---|---|
| 3,044,790 | 7/1962 | Stoner ............................. 29/159.2 |
| 3,589,164 | 6/1971 | Constant ........................... 72/354 |
| 3,780,413 | 12/1973 | Burgdorf ......................... 29/159.2 |

*Primary Examiner*—Richard J. Herbst
*Attorney, Agent, or Firm*—Olson, Trexler, Wolters, Bushnell & Fosse, Ltd.

[57] ABSTRACT

A pinion gear for a screw jack or like device is disclosed. The member includes a shank, a collar at one end of the shank, and side gear teeth formed on the shank collar. The other end of the shank has a tool-accommodating recess defined by a rectangular skirt. These pinion gears are produced by a cold-forming process including the steps of shearing a blank from a supply, preliminarily sizing the blank, preliminarily forming teeth on one end of the blank, finally forming the teeth and the collar on the blank end, back-extruding the recess skirt at the other blank end, and crimping the skirt to form the desired tool-accommodating rectangular cross-sectional shape.

2 Claims, 12 Drawing Figures

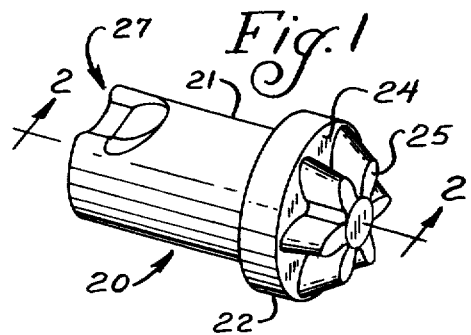
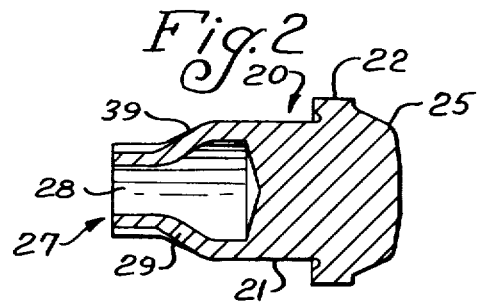
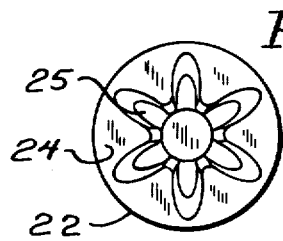
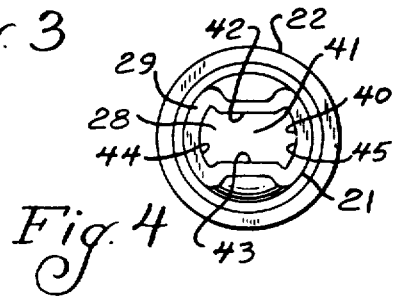
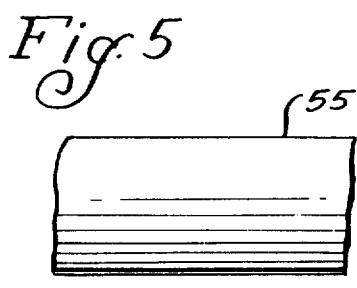
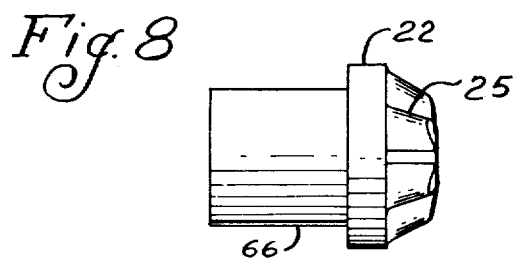
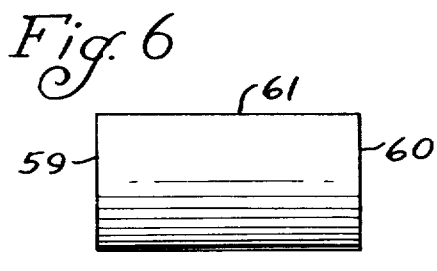
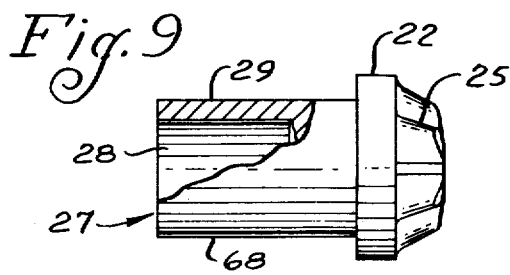
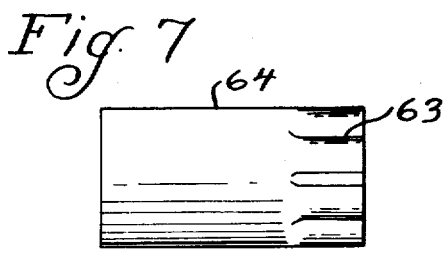
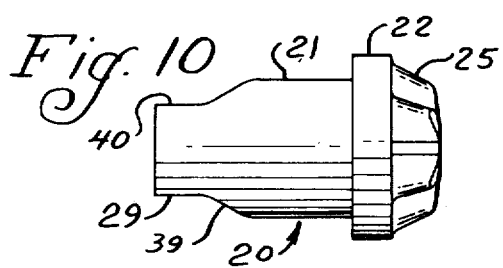

SCREW JACK PINION GEAR AND METHOD OF MAKING SAME

This is a division of application Ser. No. 388,391, filed Aug. 15, 1973, now U.S. Pat. No. 3,862,577.

BACKGROUND OF THE INVENTION

This invention relates generally to lifting devices such as screw jacks and the like, and more particularly concerns a novel gear part for use in a screw jack.

Lifting jacks designed for use with trucks and like vehicles must be efficient, safe and low in cost if they are to find acceptance in the modern marketplace. One of the most effective jacks now available is a screw-type jack which includes a housing, and a screw member carried at least partially within the housing for extensive and retractive motion. A jack pinion gear is journaled in the housing; rotation of the pinion gear turns a crown gear connected to the screw member and causes the desired jacking motion.

Stringent operating characteristics are demanded of this pinion gear and the gear production method must be low in cost. For many years, these requirements dictated that most commercially produced pinion gears for lifting jacks be produced by methods involving the casting of metal.

It is the general object of the present invention to provide a high quality pinion gear for a screw jack or the like at a low commercial cost.

It is a more specific object of the invention to provide a finished pinion gear at a significant cost saving when compared to pinion gears produced by other methods. A related object is to produce a commercially acceptable jack pinion gear by cold-forming, as opposed to casting and/or machining.

It is another object of the invention to provide a method of making these pinion gears in relatively great quantities and at relatively high speeds.

Yet another specific object is to provide a strong pinion gear able to withstand the relatively high stresses which may be encountered in jack operations.

A further object is to provide a tough pinion gear which will provide a long service life without gear tooth breakage, deformation, or other unacceptable damage.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view showing an embodiment of the novel pinion gear;

FIG. 2 is a sectional view of the pinion gear taken substantially in the plane of line 2—2 in FIG. 1;

FIG. 3 is an elevational view of one end of the pinion gear;

FIG. 4 is an elevational view of the opposite end of the pinion gear;

FIG. 5 is a side view of a relatively unformed or raw pinion gear blank;

FIG. 6 is a side view of a pinion gear blank as it appears after sizing and preliminary shaping;

FIG. 7 is a side view of a pinion gear blank as it appears after preliminary formation of gear teeth on one end;

FIG. 8 is a side view of a pinion gear blank as it appears after final formation of the pinion gear teeth and an associated collar;

FIG. 9 is a side view of a pinion gear blank as it appears after formation of a recess in an opposite end of the gear blank; portions of the gear blank being broken away to show in further detail the recess;

FIG. 10 is a side view of a finished pinion gear;

DETAILED DESCRIPTION

Figure 11:
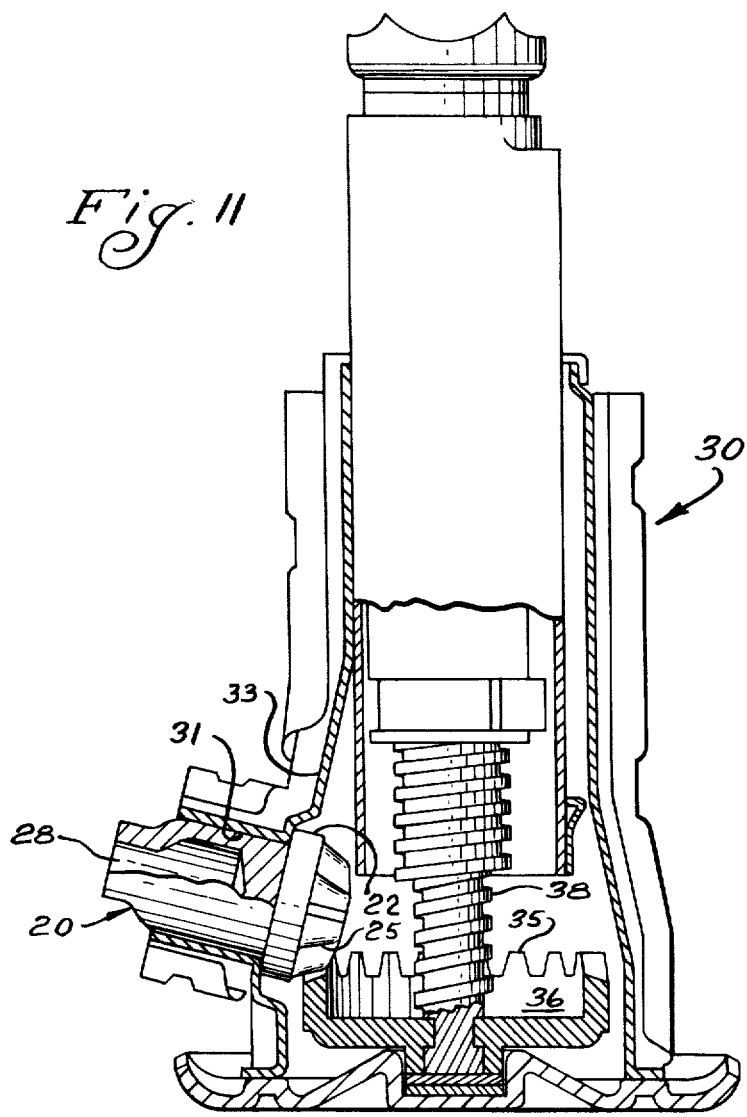
FIG. 11 is a side elevational view of a jack utilizing the novel pinion gear, portions of the jack being broken away to show in further detail the arrangement of the pinion gear and associated jack parts.

While the invention will be described in connection with a preferred embodiment and procedure, it will be understood that it is not intended to limit the invention to that embodiment or procedure. On the contrary, it is intended to cover all alternatives, modifications and equivalents as may be included within the spirit and scope of the invention.

An embodiment of the novel pinion gear is shown in FIGS. 1-4 and elsewhere. In accordance with one aspect of the invention, this gear 20 includes a shank portion 21 which may be cylindrical, having a circular cross-sectional shape. Formed at one end of the shank 21 is an enlarged collar portion 22, and formed in turn upon the face 24 of the collar 22 is a plurality of side gear teeth 25. At the opposite end 27 of the shank 21, a tool-accommodating formation is included, which may, as shown here, include a recess 28 defined by a skirt 29.

As illustrated in FIG. 11, the pinion gear 20 including these parts is specially designed for use in a screw jack 30. The gear is journaled in an appropriate bearing surface 31 formed in the side of jack housing 33. The collar 22 assists in axially locating the pinion gear within the jack housing journal 31 and locates the pinion gear teeth 25 to engage the teeth 35 of a crown gear 36. Appropriate insertion of a jack operating tool (not shown) in the gear recess 28 and subsequent rotation of the tool turns the pinion gear 20 and causes corresponding rotation of the crown gear 36, so as to extend or retract the screw member 38.

As shown in FIG. 4, the recess 28 and surrounding skirt portion 29 provided in this embodiment are specifically adapted to accommodate or receive the jack operating tool (not shown). To this end, the skirt includes a transitional neck portion 39 and terminates in an edge 40 formed for engagement by the tool, and in the illustrated embodiment, this terminal edge 40 and the opening 41 to the recess 28 formed by the edge 40 are substantially rectangular in shape. More specifically, two generally parallel edges 42 and 43 are formed on opposite sides of the opening and are separated by slightly arcuate opposing skirt sides 44 and 45.

Figure 12:
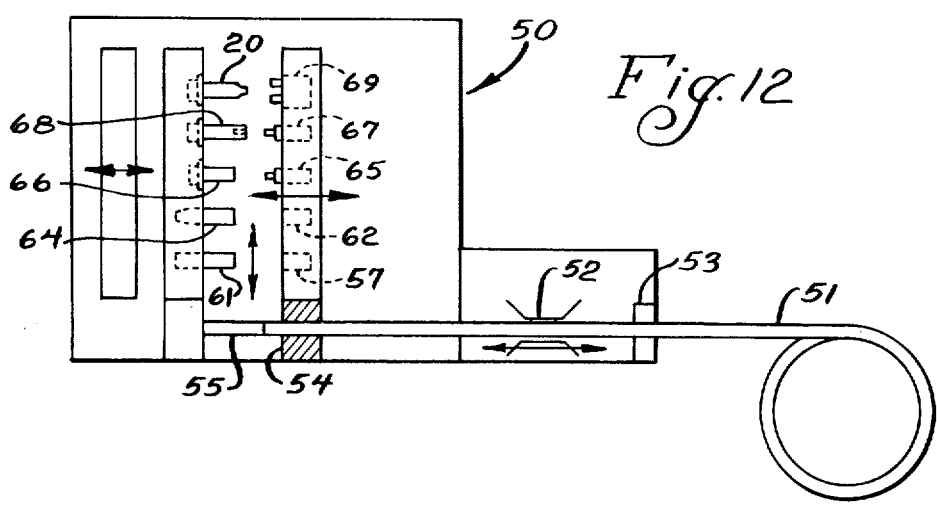
FIG. 12 is a schematic diagram of a typical multistation cold forming press machine used to produce the novel pinion gear in accordance with the present invention.

In accordance with another aspect of the invention, formation of this novel pinion gear 20 is economical, and comprehends the production of relatively large numbers of pinion gear members at relatively high speed and low cost by using a multi-station cold forming press such as the machine 50 shown in FIG. 12. During operation, the machine 50 is provided with a relatively large supply 51 of stock for gear member formation. This supply preferably comprises coiled rod, but can include bar stock or similar elongated members. A gripping and pulling mechanism 52 first grips a portion of the illustrated coiled stock 51, pulls a portion of the stock through a preliminary sizing die 53, and then releases the stock 51. At a downstream location, a blank shearing mechanism 54 is provided to cut off or otherwise separate a blank 55 of relatively roughly pre-determined axial length, such as that shown in FIG. 5, from the stock 51. This cutoff mechanism can include a shear knife mechanism and a blank transfer device (not shown).

After cutoff, the blank 55 is transferred to a first operating station where the blank 55 is inserted into a die 57. Upon the first operating stroke of the machine, the blank 55 is sized and the ends 59 and 60 are squared to produce the blank 61 shown in FIG. 6.

After completion of this first forming operation, the blank 61 is removed from the first station 57 and relocated at a second work station 62. During the second operating stroke of the machine 50, preliminary tooth shapes 63 are formed to produce the blank 64 illustrated in FIG. 7.

After the second operation the blank is transferred to a third work station 65. Upon a third operating stroke of the machine, the final tooth shapes 25 and the collar 22 are formed by an upset operation, producing a blank 66 similar to that shown in FIG. 8.

The blank 66 is next positioned at a fourth work station 67, where a die punch is inserted into the opposite end 27 of the blank 67. This operation back-extrudes or back-forms the recess 28 and the surrounding cylindrical skirt 29, producing a blank 68 like that shown in FIG. 9.

Upon location of the blank 67 at a fifth work station 69, opposite sides of this skirt 29 are crimped to form the generally rectangular opening 28 shown in FIG. 4, and to produce the final shape of the pinion gear 20 shown in FIGS. 1–4 and 10. It will be understood that a multistation coil fed horizontal cold forming press of the type contemplated can perform each of the described cold forming operations upon successive part blanks at each of the stations during each press operating cycle. Thus, a total of five part blanks may be carried in the machine, one blank being positioned at each of the cold forming stations. Upon completion of a single operating cycle of the machine, a new raw blank 55 is located at the first work station 57, each succeeding blank is withdrawn from its operating station and transferred to the next station, and a finished part is dropped into a receiving hopper. Thus, the described production steps occur in seriatim order, and one finished pinion gear is produced with each operating stroke of the machine. High speed, low cost part production is thus achieved.

The invention is claimed as follows:

1. A method of making a pinion gear or like article including the steps of first cutting a blank from an elongated supply, next transferring the blank to a first operating station, next cold forming the cut blank to a preliminary size, next transferring the blank to a second work station, next cold forming gear teeth on one end of the blank to a preliminary shape, next transferring the blank to a third work station, next cold forming the gear teeth to a final shape and simultaneously cold forming a collar on the blank end adjacent the gear teeth, next transferring the blank to a fourth work station, next cold back extruding a recess and a skirt surrounding the recess at the other end of the blank, next transferring the blank to a fifth work station and finally cold crimping the end of the recess skirt to a pre-designated shape for engagement by a pinion-gear engaging tool.

2. A method according to claim 1 wherein said steps are performed on a multi-station cold forming press machine.

* * * * *